United States Patent
Bhattacharya et al.

(10) Patent No.: US 11,264,019 B2
(45) Date of Patent: Mar. 1, 2022

(54) METHODS, SYSTEMS, AND MEDIA FOR VOICE-BASED CALL OPERATIONS

(71) Applicant: Google LLC, Mountain View, CA (US)

(72) Inventors: Saptarshi Bhattacharya, Seattle, WA (US); Shreedhar Madhavapeddi, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/921,178

(22) Filed: Mar. 14, 2018

(65) Prior Publication Data

US 2019/0005955 A1 Jan. 3, 2019

Related U.S. Application Data

(60) Provisional application No. 62/527,840, filed on Jun. 30, 2017.

(51) Int. Cl.
| | | |
|---|---|---|
| *G06F 3/16* | (2006.01) | |
| *G10L 15/08* | (2006.01) | |
| *G10L 15/22* | (2006.01) | |
| *H04L 29/06* | (2006.01) | |
| *H04L 29/08* | (2006.01) | |
| *H04M 3/56* | (2006.01) | |
| *H04L 65/1083* | (2022.01) | |
| *H04L 67/148* | (2022.01) | |

(52) U.S. Cl.
CPC .............. *G10L 15/22* (2013.01); *G06F 3/167* (2013.01); *G10L 15/08* (2013.01); *H04L 65/1083* (2013.01); *H04L 67/148* (2013.01); *H04M 3/563* (2013.01); *G10L 2015/088* (2013.01); *G10L 2015/223* (2013.01)

(58) Field of Classification Search
CPC .............................. G10L 15/265; G10L 15/22
See application file for complete search history.

(56) References Cited

U.S. PATENT DOCUMENTS

| | | | |
|---|---|---|---|
| 6,363,349 B1* | 3/2002 | Urs .......................... | G10L 13/00 704/275 |
| 6,650,748 B1* | 11/2003 | Edwards ............... | H04M 3/523 379/265.01 |
| 7,466,977 B2 | 12/2008 | Levien et al. | |

(Continued)

FOREIGN PATENT DOCUMENTS

WO    WO/2001027895    4/2001

OTHER PUBLICATIONS

3GPP, "Technical Specification Group Core Network and Terminals; Communication Diversion (CDIV) using IP Multimedia (IM) Core Newtowrk (CN) Subsystem; Protocol Specification (Release 14)", Technical Paper, Mar. 17, 2017, pp. 1-59.

(Continued)

*Primary Examiner* — Daniel C Washburn
*Assistant Examiner* — Oluwadamilola M Ogunbiyi
(74) *Attorney, Agent, or Firm* — Byrne Poh LLP

(57) ABSTRACT

Methods, systems, and media for voice-based call operations are provided. In some embodiments, a method comprises: receiving, at a first user device, a communication; detecting a voice command, using the first user device, that includes a keyword; and in response to detecting the voice command, causing the communication to be transferred to a second user device that is associated with the keyword.

21 Claims, 5 Drawing Sheets

(56) References Cited

U.S. PATENT DOCUMENTS

| | | | |
|---|---|---|---|
| 7,587,032 B1* | 9/2009 | de Waal | H04M 1/724 379/67.1 |
| 8,340,631 B2* | 12/2012 | Mann | H04M 3/436 455/405 |
| 9,037,455 B1* | 5/2015 | Faaborg | G10L 21/00 704/208 |
| 9,065,786 B2* | 6/2015 | Plotkin | H04L 51/02 |
| 9,424,840 B1* | 8/2016 | Hart | G10L 15/22 |
| 9,570,075 B1 | 2/2017 | Kashimba et al. | |
| 9,571,532 B1 | 2/2017 | Kashimba et al. | |
| 10,026,394 B1* | 7/2018 | Carbon | G10L 15/00 |
| 2002/0055973 A1* | 5/2002 | Low | H04L 12/1822 709/204 |
| 2004/0019489 A1 | 1/2004 | Funk et al. | |
| 2004/0266416 A1* | 12/2004 | Matsumoto | H04M 1/72566 455/418 |
| 2005/0265318 A1* | 12/2005 | Khartabil | H04M 3/436 370/328 |
| 2006/0114852 A1* | 6/2006 | Levien | H04W 4/16 370/329 |
| 2008/0248797 A1* | 10/2008 | Freeman | H04M 1/72533 455/425 |
| 2009/0093240 A1* | 4/2009 | Lang | H04L 12/1818 455/416 |
| 2010/0227631 A1* | 9/2010 | Bolton | H04L 51/24 455/466 |
| 2011/0022885 A1* | 1/2011 | Holappa | H04L 29/12094 714/4.12 |
| 2011/0063506 A1 | 3/2011 | Reams | |
| 2012/0159353 A1* | 6/2012 | Beerse | G06Q 10/101 715/756 |
| 2013/0053152 A1* | 2/2013 | Tabata | A63F 13/31 463/42 |
| 2013/0281054 A1* | 10/2013 | Ye | H04W 4/60 455/410 |
| 2013/0321340 A1* | 12/2013 | Seo | G06F 3/04883 345/174 |
| 2014/0108943 A1 | 4/2014 | Lee et al. | |
| 2014/0136195 A1* | 5/2014 | Abdossalami | G10L 15/26 704/235 |
| 2014/0207468 A1* | 7/2014 | Bartnik | G10L 15/22 704/275 |
| 2014/0233559 A1* | 8/2014 | Zhong | H04L 65/403 370/352 |
| 2014/0278438 A1* | 9/2014 | Hart | G06F 3/167 704/275 |
| 2014/0331144 A1 | 11/2014 | Kim et al. | |
| 2014/0362982 A1* | 12/2014 | Han | H04M 3/56 379/202.01 |
| 2015/0201022 A1 | 7/2015 | Kim et al. | |
| 2015/0229677 A1* | 8/2015 | Gu | H04L 65/103 709/219 |
| 2015/0237144 A1* | 8/2015 | Miao | H04L 65/1006 709/228 |
| 2015/0350421 A1 | 12/2015 | Lau et al. | |
| 2016/0019896 A1 | 1/2016 | Alvarez Guevara et al. | |
| 2016/0065711 A1* | 3/2016 | De Carney | H04M 1/642 455/412.1 |
| 2016/0105292 A1 | 4/2016 | Choi et al. | |
| 2016/0150089 A1* | 5/2016 | Garg | H04L 67/02 370/352 |
| 2016/0261648 A1* | 9/2016 | Ruetschi | G06F 40/263 |
| 2016/0285979 A1 | 9/2016 | Wang et al. | |
| 2016/0314792 A1 | 10/2016 | Alvarez Guevara et al. | |
| 2016/0349722 A1* | 12/2016 | On | H04L 12/6418 |
| 2016/0364223 A1 | 12/2016 | Vandikas et al. | |
| 2017/0034042 A1 | 2/2017 | Gross et al. | |
| 2017/0134553 A1 | 5/2017 | Jeon et al. | |
| 2017/0221487 A1 | 8/2017 | Faaborg et al. | |
| 2017/0237815 A1 | 8/2017 | Arsenault et al. | |
| 2017/0270916 A1* | 9/2017 | Prokhorov | G10L 15/1822 |
| 2017/0279963 A1* | 9/2017 | Mittal | H04M 15/06 |
| 2018/0061419 A1 | 3/2018 | Melendo Casado et al. | |
| 2018/0109681 A1* | 4/2018 | Mclean, Jr. | H04M 1/72547 |
| 2018/0132076 A1* | 5/2018 | Chen | H04M 3/48 |
| 2018/0139253 A1* | 5/2018 | Ruetschi | G06F 40/58 |
| 2018/0174434 A1 | 6/2018 | Dyer et al. | |
| 2018/0197550 A1* | 7/2018 | Wang | H04M 1/6075 |
| 2018/0220472 A1* | 8/2018 | Schopp | H04W 76/10 |
| 2019/0005956 A1 | 1/2019 | Bhattacharya et al. | |
| 2019/0245680 A1 | 8/2019 | Boutaba et al. | |

OTHER PUBLICATIONS

3GPP, "Technical Specification Group Services and System Aspects; IP Multimedia Subsystem (IMS) Service Continuity; State 2 (Release 14)", Technical Paper, Dec. 16, 2016, pp. 1-180.

International Search Report and Written Opinion dated Jun. 7, 2018 in International Patent Application No. PCT/US2018/022381.

International Search Report and Written Opinion dated Jun. 7, 2018 in International Patent Application No. PCT/US2018/022697.

Office Action dated Feb. 12, 2020 in U.S. Appl. No. 15/922,602.

Office Action dated May 26, 2020 in U.S. Appl. No. 15/922,602.

Office Action dated Sep. 14, 2020 in U.S. Appl. No. 15/922,602.

Examination Report dated Apr. 30, 2021 in EP Patent Application No. 18718958.4.

Office Action dated Mar. 11, 2021 in U.S. Appl. No. 15/922,602.

Office Action dated Jul. 6, 2021 in U.S. Appl. No. 15/922,602.

Notice of Allowance dated Dec. 23, 2021 in U.S. Appl. No. 15/922,602.

* cited by examiner

METHODS, SYSTEMS, AND MEDIA FOR VOICE-BASED CALL OPERATIONS

CROSS-REFERENCE TO RELATED APPLICATION

This application claims the benefit of U.S. Provisional Application No. 62/527,840, filed Jun. 30, 2017, which is hereby incorporated by reference herein in its entirety.

TECHNICAL FIELD

The disclosed subject matter relates to methods, systems, and media for voice-based call operations.

BACKGROUND

Mobile telecommunications devices are increasingly popular. Frequently, a given person or household will have several such devices. Often, users may receive calls on these devices when they are occupied with another device, occupied with another task, or would prefer to engage in a call using another device. As a result, users will often either ignore a call, or answer a call with an unpreferred device.

Accordingly, it is desirable to provide new methods, systems, and media for voice-based call operations.

SUMMARY

In accordance with some embodiments of the disclosed subject matter, mechanisms for voice-based call operations are provided.

In accordance with some embodiments of the disclosed subject matter, a method is provided, the method comprising: receiving, at a first user device, a communication; detecting a voice command, using the first user device, that includes a keyword; and in response to detecting the voice command, causing the communication to be transferred to a second user device that is associated with the keyword.

In some embodiments, the communication is an invitation to join a telecommunication channel.

In some embodiments, the telecommunication channel is an Internet videotelephony channel.

In some embodiments, the method further comprises: in response to receiving the invitation to join the telecommunication channel, presenting a notification of the invitation during a period of time, wherein the period of time is terminated upon acceptance of the invitation, and wherein the voice command is detected during the period of time.

In some embodiments, the method further comprises: causing the second user device to join the telecommunication channel.

In some embodiments, causing the communication to be transferred to the second user device is further in response to detecting a second keyword in the voice command, wherein the second keyword corresponds to a communication transfer operation.

In some embodiments, the communication is an SMS message or an MMS message.

In some embodiments, the method further comprises: receiving an indication of the keyword; and determining that the keyword is to be associated with the second user device.

In accordance with some embodiments of the disclosed subject matter, a system is provided, the system comprising a hardware processor that is configured to: receive, at a first user device, a communication; detect a voice command, using the first user device, that includes a keyword; and in response to detecting the voice command, cause the communication to be transferred to a second user device that is associated with the keyword.

In accordance with some embodiments of the disclosed subject matter, a non-transitory computer-readable medium is provided, the non-transitory computer-readable medium containing computer-executable instructions that, when executed by a processor, cause the processor to perform a method comprising: receiving, at a first user device, a communication; detecting a voice command, using the first user device, that includes a keyword; and in response to detecting the voice command, causing the communication to be transferred to a second user device that is associated with the keyword.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
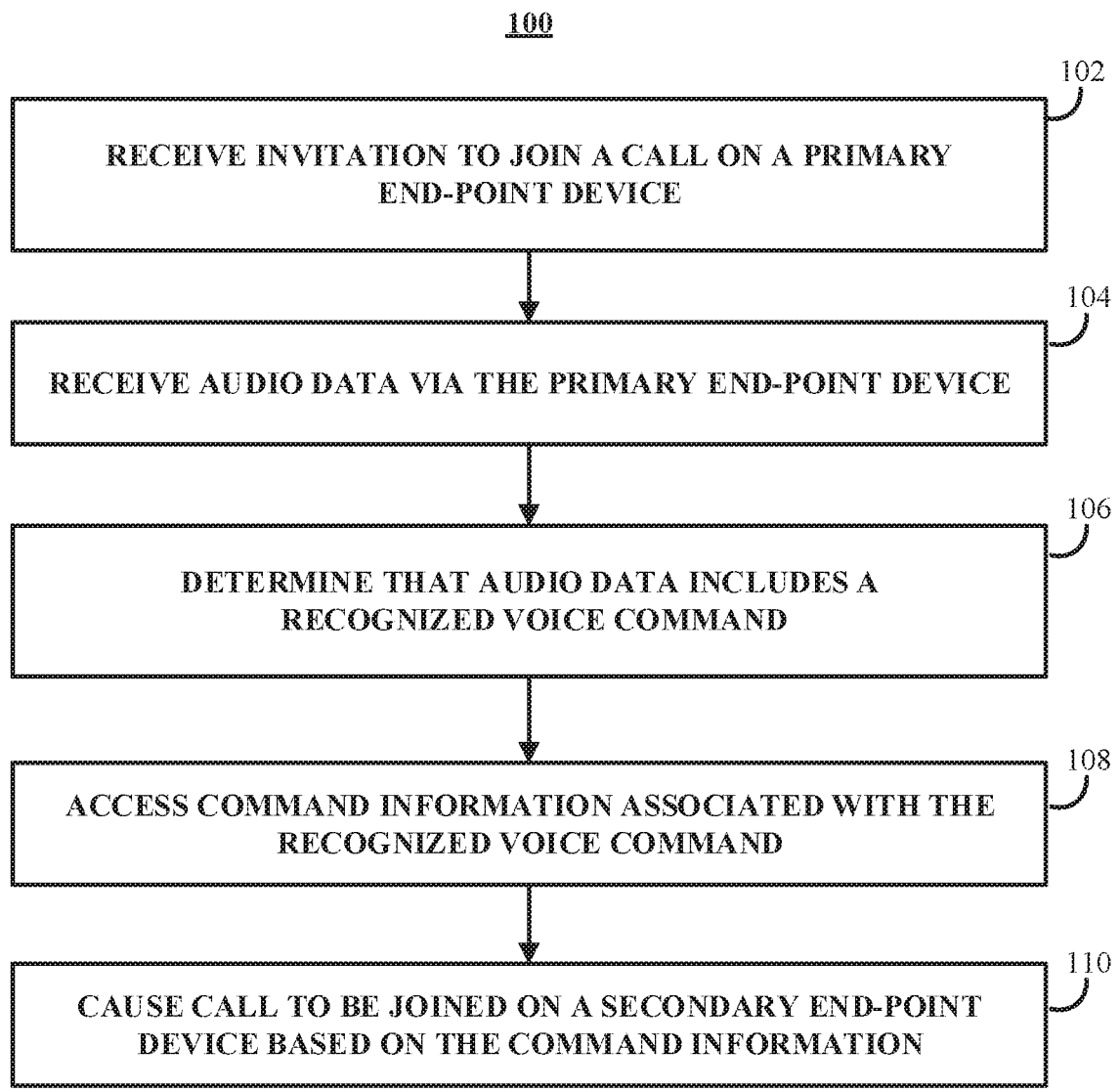
FIG. 1 shows an example of a process for transferring a call in accordance with some embodiments of the disclosed subject matter.

In accordance with various embodiments of the disclosed subject matter, mechanisms (which can include methods, systems, and media) for voice-based call operations are provided.

In some embodiments of the disclosed subject matter, the mechanisms described herein can detect a user's voice commands, and in response to the voice commands, perform call operations associated with the voice commands. For example, the mechanisms can detect a user voice command that is associated with an operation for transferring a call from one device to another. As a more particular example, when receiving a telephone call at a mobile phone, and before the call has been accepted, the mechanisms can detect a user speaking a phrase such as "transfer call to my tablet," and cause the call to be answered on a tablet rather than on the mobile phone.

In some embodiments, the mechanisms can provide a user with the opportunity to configure and/or customize voice commands and the operations with which the voice commands are associated. For example, the mechanisms can allow a user to select which operations are to be associated with which voice commands. As a more particular example, the mechanisms can allow a user to configure one voice command for transferring a call to a tablet device, and configure another voice command for transferring a call to a laptop computer. As another example, the mechanisms can allow a user to select keywords and/or key phrases that are to be recognized as voice commands. As a more particular example, the mechanisms can provide a user with an opportunity to speak keywords and/or key phrases that the user wishes to be recognized as a voice command, detect the keywords and/or key phrases being spoken, and then store information pertaining to the keywords and/or key phrases detected, in connection with a call operation, as a voice command. To continue this example, at a later time, the mechanisms can then detect that the user has spoken keywords and/or key phrases using, for example, a speech detection technique, recognize that the keywords and/or key phrases correspond to a configured voice command, and cause the corresponding call operation to be performed.

In some embodiments, the mechanisms described herein can cause a call to be temporarily answered in response to a voice command, or in response to a user input. For example, in some embodiments, after receiving an invitation to join a call, but before joining the call, the mechanisms can detect that a user has spoken a voice command (e.g., "I'm busy"), cause the call to be joined, and then automatically terminate the call after a predetermined amount of time. During the predetermined amount of time, the user can then, for example, explain to a caller that the user cannot take the call.

It should be understood that as used herein, the phrase "transfer a call" can refer to any operation which causes a call of any type to be joined on a device that is separate from the device receiving an invitation to join the call.

FIG. 1 shows an example 100 of a process for transferring a call in accordance with some embodiments of the disclosed subject matter.

At 102, process 100 can receive an invitation to join a call on a primary end-point device.

In some embodiments, the primary end-point device can be any suitable end-point device, such as an end-point device 410, as described below in connection with FIG. 4.

In some embodiments, process 100 can receive an invitation to join any suitable type of call. For example, process 100 can receive an invitation to join a telephone call, a VoIP ("Voice over Internet Protocol") call, a video call, an audio tele-conference call, or any other suitable type of call.

In some embodiments, in addition or in alternative to receiving an invitation to join a call, process 100 can receive a text message (e.g., a Short Message Service ("SMS") message) or multimedia message (e.g., a Multimedia Messaging Service ("MMS") message, image message, video message, audio message, and/or any suitable combination thereof) at 102.

In some embodiments, process 100 can receive any suitable type of invitation. For example, process 100 can receive a ringdown, an e-mail containing the invitation, a text message containing the invitation, an invitation configured for a particular communication application installed on the primary end-point device, any other suitable type of invitation, or any suitable combination thereof.

In some embodiments, at 102, in response to receiving an invitation, process 100 can present any suitable notification of the invitation. For example, process 100 can present call notification element 302 as described below in connection with FIG. 3. As another example, process 100 can present a tactile or audio notification. In some embodiments, process 100 can cause a presented notification to be terminated in response to an invitation being accepted, a call being joined, and/or a text message being opened. Additionally or alternatively, in some embodiments, process 100 can cause a notification of an invitation to be presented during a predetermined period of time.

At 104, process 100 can receive audio data via the primary end-point device.

In some embodiments, process 100 can receive audio data by causing a microphone to be activated, and receiving the audio data via the microphone. In some embodiments, process 100 can cause a microphone to be activated in response to receiving an invitation to join a call. Any suitable microphone can be used in some embodiments. For example, process 100 can use a microphone of the primary end-point device, a microphone of headphones connected to the primary end-point device, a microphone connected to the primary end-point device, a microphone of another device that is communicatively connected to the primary end-point device (e.g., using a wireless connection), or any other suitable microphone.

In some embodiments, at 104, process 100 can receive audio data via a transmission from a primary end-point device. For example, in a configuration in which process 100 is being executed at least in part using a server device (e.g., a server device as described below in connection with FIG. 4), a primary end-point device can transmit audio data to process 100 via an Internet connection.

In some embodiments, at 104, process 100 can receive audio data having any suitable format. For example, process 100 can receive: raw audio data (e.g., audio data that is in a pulse code modulation format); audio data in a compressed format (e.g., MPEG layer 3); audio data in a lossless compression format (e.g., Free Lossless Audio Codec); audio data in any other suitable format; and/or any suitable combination thereof.

At 106, process 100 can determine that received audio data includes a recognized voice command.

In some embodiments, process 100 can use any suitable speech recognition technique to determine that received audio data contains a recognized command. For example, process 100 can use acoustic modeling, language modeling, Hidden Markov Models, dynamic time warping algorithms, neural networks, deep neural networks, end-to-end automatic speech recognition, any other suitable speech recognition technique, or any suitable combination thereof to determine that audio data contains a recognized command.

In some embodiments, at 106, process 100 can determine that audio data contains a recognized command by identifying a keyword, keywords, or key phrases that are associated with the recognized command. For example, a recognized command for transferring a call can be associated with a single keyword, such as "transfer," several keywords, such as "transfer," "switch," and "move," or a key phrase such as "I'll take the call on my tablet." In a situation in which the recognized command is associated with several keywords, process 100 can require that all of the associated keywords, or that only a portion of the associated keywords, be identified in the audio data in order to recognize the command.

In some embodiments, certain keywords associated with a recognized voice command can correspond to operations to be performed on an end-point device, while other keywords can correspond to end-point devices. For example, a keyword such as "transfer" can correspond to an operation for transferring a call to another device. As another example, a keyword such as "tablet" can correspond to a tablet end-point device. As a more particular example, in a situation in which process 100 receives audio data that is recognized to contain both the keyword "transfer" and the keyword "tablet," process 100 can determine that the audio data includes a recognized voice command for transferring a call to a tablet end-point device.

In some embodiments, in addition to determining that audio data contains keywords and/or key phrases corresponding to a recognized voice command, at 106, process 100 can determine that received audio data includes a recognized voice (e.g., based on stored voice information, as discussed below in connection with FIG. 2) using any suitable voice recognition, speaker identification, or speaker verification technique. For example, process 100 can use frequency estimation, Hidden Markov Models, Gaussian mixture models, pattern matching algorithms, neural networks, matrix representation, vector quantization, template matching, text-dependent techniques, text-independent techniques, any other suitable technique, or any suitable combination thereof to determine that received audio data includes a recognized voice.

In some embodiments, a recognized voice command can correspond to a user-defined voice command. For example, in some embodiments, user-defined voice commands can be configured and stored using process 200 as described below in connection with FIG. 2.

Additionally or alternatively, in some embodiments, a recognized voice command can correspond to a voice command that is not user-defined. For example, a recognized voice command can correspond to a voice command that is based on a set of keywords and/or key phrases that are programmatically defined. As another example, a recognized voice command can correspond to a voice command that is based on a set of keywords and/or key phrases that are received from an external source. As a more particular example, a recognized voice command can be based on indications of keywords that correspond to end-point devices and/or operations that process 100 can receive from a server device that is associated with a user account of a user and/or associated with a device of the user.

In some embodiments, in addition or in alternative to recognizing a voice command that has already been configured and/or defined, at 106, process 100 can use any suitable artificial intelligence mechanism (e.g., a virtual assistant mechanism) to determine that received audio data includes an unconfigured voice command. For example, process 100 can use any suitable artificial intelligence mechanism to determine that a portion of received speech is a voice command, and determine an operation to be performed based on the voice command. As a more particular example, process 100 can determine that a user has spoken a phrase such as "take the call on my television," and use artificial intelligence to determine that this phrase corresponds to a voice command for transferring a call (e.g., a video call) to a television device associated with the user.

At 108, process 100 can access command information associated with a recognized voice command.

In some embodiments, command information can include information corresponding to an operation that is to be performed in response to receiving a voice command. For example, command information can include information identifying an operation, information to be used in performing an operation, information identifying a device to be used in performing an operation, information identifying an application that can be used in performing an operation (e.g., a messaging application, a VoIP application, or a video calling application), any other suitable information, or any suitable combination thereof. As a more particular example, in situations in which an operation is a call transfer operation, command information can include information identifying a device to transfer a call to, information used to initiate a connection with a device (e.g., a phone number, an I.P. address, or wireless connection configuration information), authentication information associated with a device to which a call is being transferred (e.g., a user name and/or password), any other suitable information related to transferring a call, or any suitable combination thereof.

In some embodiments in which command information includes information related to an operation that is associated with a recognized voice command, the operation can be any suitable operation. For example, an operation can be a temporarily answer operation, an ignore call operation, any other suitable operation, or any suitable combination thereof.

In some embodiments, command information can be accessed, at 108, using any suitable technique or combination of techniques. For example, in some embodiments, in situations in which process 100 is being executed at least in part by a primary end-point device, the command information can be stored at, and accessed by, the primary end-point device. As another example, in some embodiments, the command information can be stored at a server device (e.g., a server device as described below in connection with FIG. 4) and the primary end-point can transmit a request (e.g., a Hypertext Transfer Protocol request) to the server device for the command information. As yet another example, in a configuration in which process 100 is being executed at least in part by a server device, command information can be stored at the server device and accessed by the server device.

In some embodiments, command information can originate from any suitable source. For example, command information can originate from process 200 for configuring a voice command, as described below in connection with FIG. 2.

At 110, process 100 can cause a call corresponding to received invitation to be joined on a secondary end-point device based on command information.

In some embodiments, a secondary end-point device can be any suitable end-point device, such as an end-point device 410, as described below in connection with FIG. 4.

In some embodiments, at 110, process 100 can cause a call to be joined based on command information that indicates any suitable operation for transferring a call to another device. For example, command information can indicate an operation for transferring a particular type of invitation to join a call. As a more particular example, command information can indicate an operation for transferring telephone calls. As another example, command information can indicate an operation for transferring a call to a particular secondary end-point device (e.g., a particular tablet device, a particular mobile phone device, or any other suitable end-point device as described below in connection with FIG. 4). In some embodiments, command information can further indicate a particular call transfer technique to be used.

In some embodiments, at 110, process 100 can use any suitable call transfer technique to cause a call to be joined on a secondary end-point device. For example, in a situation in which the call is a telephone call, process 100 can use a warm transfer technique, a tepid transfer technique, a cold transfer technique, a three-way calling technique, or any other suitable technique to cause a call to be joined on a secondary end-point device. As another example, in a situation in which the call is a VoIP call, process 100 can utilize a Session Initiation Protocol ("SIP") blind call transfer technique, an SIP attended call transfer technique, a call parking technique, a live call transfer technique, a three-way calling technique, a conference bridge technique, any other suitable technique, or any suitable combination thereof to cause a call to be joined on a secondary end-point device. As yet another example, in a situation in which the call is a video call, process 100 can cause the call to be joined on a secondary end-point device utilizing information identifying the secondary end-point device, and causing a server device (e.g., server device 402, as described below in connection with FIG. 4) associated with the call to transfer the invitation to the secondary end-point device. As a more particular example, in a situation in which a video call is associated with a user account of a video calling service (e.g., in which an invitation to join the call was sent to the user account of the video calling service), and a secondary end-point has been previously used and/or configured in connection with the user account of the video calling service, process 100 can transmit information identifying the secondary end-point device to a server device associated with the video calling service, and cause the server device associated with the video calling service to transfer the video call to the secondary end-point device.

In some embodiments, at 110, process 100 can cause a call to be joined on a secondary end-point device using any suitable command information described above in connection with 108 of FIG. 1.

In some embodiments, at 110, process 100 can cause a call to be joined on a secondary end-point device using command information identifying the secondary end-point device. For example, process 100 can cause a call to be joined on a secondary end-point device by transmitting the information identifying the secondary end-point device to a server device that is associated with the call (e.g., a server device that is associated with a calling service). In such an example, the server device can cause an invitation to be transferred to the secondary end-point device, cause the secondary end-point device to accept an invitation, and/or cause the secondary end-point device to join the call automatically.

In some embodiments, at 110, process 100 can cause a call to be joined on a secondary end-point device using command information that can be used to initiate a connection with the secondary end-point device (e.g., an Internet Protocol address, a BLUETOOTH address, a local device identifier, a Media Access Control address, or any other suitable information that can be used to initiate a connection). For example, process 100 can use such information to initiate a connection with a secondary end-point device (e.g., using communications links 412 and 416, as described below in connection with FIG. 4) and transmit a request to the secondary end-point device that is configured to cause the secondary end-point device to join the call.

In some embodiments, at 110, process 100 can cause a call to be joined on a secondary end-point device before the call is joined on a primary end-point device. For example, process 100 can cause a call to be joined on a secondary end-point device by transferring the call to the secondary end-point device while an invitation to join the call is pending. As a more particular example, in a situation in which a call is a telephone call, process 100 can cause the call to be transferred to a secondary end-point device before the call is connected using a technique as described above for transferring a telephone call.

In some embodiments in which process 100 has received a multimedia message at 102, in alternative to causing a call to be joined at 110, process 100 can cause the multimedia message to be presented on a secondary end-point device. For example, process 100 can receive a video message at 102, determine that a recognized voice command corresponds to an operation for presenting a multimedia message on a television device at 108, and cause the video message to be presented on the television device at 110.

Figure 2:
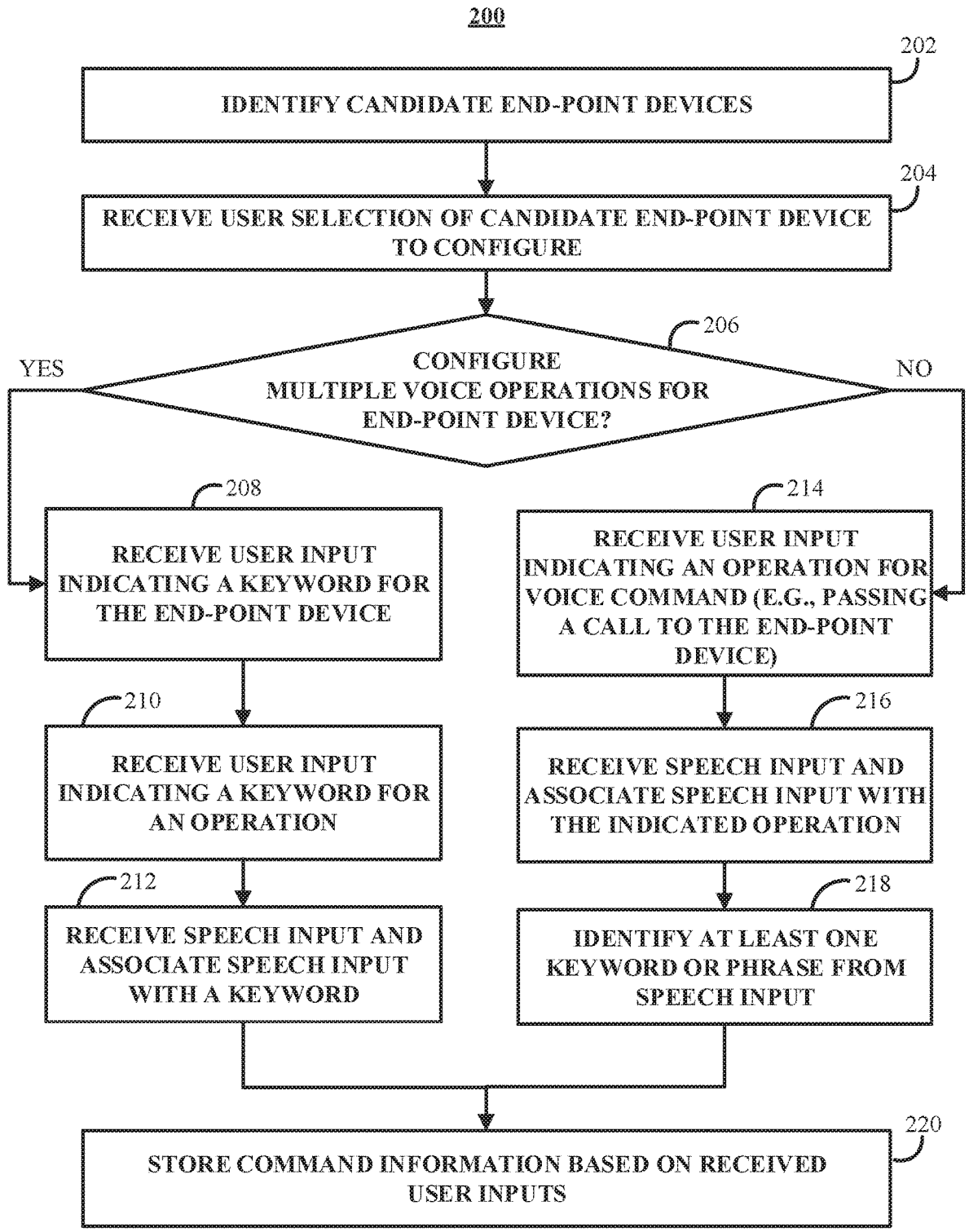
FIG. 2 shows an example of a process for configuring voice-based call operations in accordance with some embodiments of the disclosed subject matter.

FIG. 2 shows an example 200 of a process for configuring voice-based call operations in accordance with some embodiments of the disclosed subject matter.

At 202, process 200 can identify one or more candidate end-point devices to configure for voice-based call operations.

In some embodiments, a candidate end-point device can be any device suitable for receiving an invitation to join a call, and/or for connecting to a call. For example, a candidate end-point device can be a mobile phone, a tablet device, a computing device, and/or any other suitable end-point device. Additionally or alternatively, in some embodiments, a candidate end-point device can be any device that is available to connect to a call.

In some embodiments, at 202, process 200 can identify a candidate end-point device using any suitable technique or combination of techniques. For example, process 200 can determine that an end-point device is a candidate end-point device based on determining that the end-point device is on the same local area network as a device executing process 200. As a more particular example, in a configuration in which process 200 is being executed on a primary end-point device that is connected to a local area network, process 200 can determine that a secondary end-point device is a candidate end-point device based on the secondary end-point device being connected to the same local area network. As another example, process 200 can determine that an end-point device is a candidate end-point device based on the end-point device having been used or having been configured for use in connection with a particular user account. As a more particular example, in a situation where process 200 is being used to configure voice-based call operations for a user account of a telecommunications application (e.g., a VoIP calling application), process 200 can determine that an end-point device is a candidate based on a determination that the end-point device has been used to access the user account, and/or a determination that the end-point device has been configured to use the telecommunications application in connection with the user account.

In some embodiments, at 202, process 200 can determine that an end-point device is a candidate end-point device by initiating a wireless connection with the end-point device. For example, process 200 can initiate any suitable wireless connection with an end-point device, and in response to successfully establishing the wireless connection, determine that the end-point device is a candidate end-point device. As a more particular example, in response to successfully establishing a wireless connection, process 200 can determine that an end-point device is a candidate end-point device by determining the capabilities of the end-point device (e.g., determining that the end-point device can connect to a particular type of call).

In some embodiments, process 200 can identify one or more candidate end-point devices by receiving a user input identifying one or more candidate end-point devices.

At 204, process 200 can receive a user selection of one or more of the identified candidate end-point devices to configure for voice-based call operations.

In some embodiments, at 204, process 200 can receive a user selection using any suitable technique or combination of techniques. For example, process 200 can receive a voice-based user selection. As a more particular example, in a situation in which keywords have already been configured with respect to one or more of the identified end-point devices, process 200 can receive a user selection of one or more of the identified candidate end-point devices by detecting a user speaking a corresponding keyword. As another example, process 200 can receive a user selection by causing a user interface to be presented and by receiving a selection of a user interface element corresponding to one or more of the identified candidate end-point devices.

At 206, process 200 can determine whether to configure multiple voice operations for selected end-point device or devices.

In some embodiments, at 206, process 200 can determine whether to configure multiple voice operations for selected end-point device(s) by receiving any suitable user input indicating whether to configure multiple voice operations. For example, process 200 can receive any suitable user input described above in connection with 204.

If, at 206, process 200 determines to configure multiple voice operations for the end-point device, then at 208, process 200 can receive user input indicating a keyword to become associated with the end-point device.

In some embodiments, at 208, process 200 can receive user input using any suitable technique or combination of techniques. For example, process 200 can receive user input by causing a user interface to be presented that is configured to allow the user to input a keyword (e.g., by typing the keyword, or selecting one of a plurality of presented keywords). As another example, process 200 can prompt a user to speak a keyword and receive audio data corresponding to a spoken keyword. In such an example, process 200 can utilize any suitable speech detection technique to parse the keyword from the received audio data.

At 210, process 200 can receive user input indicating a keyword for an operation.

In some embodiments, at 210, process 200 can receive user input using any suitable technique or combination of techniques. For example, process 200 can receive user input described above in connection with 208.

In some embodiments, at 210, in connection with receiving user input indicating a keyword, process 200 can further receive user input indicating an operation to be associated with an indicated keyword. For example, process 200 can cause a user interface to be presented that includes a plurality of selectable operations to become associated with an indicated keyword, and receive an indication of one of the selectable options. As another example, in a situation in which keywords have already been configured with respect to one or more operations, process 200 can receive a user selection of an operation by detecting a user speaking a keyword corresponding to the operation.

At 212, process 200 can receive speech input and associate the speech input with a keyword indicated at 208 of FIG. 2 and/or 210 of FIG. 2.

In some embodiments, the speech input can be any suitable speech input. For example, the speech input can be audio data as described above in connection with FIG. 1.

In some embodiments, at 212, process 200 can create any suitable association between speech input and a keyword indicated at 208 and/or 210. For example, process 200 can associate speech input and a keyword such that the keyword should be recognized as a voice command when similar speech input is later received.

Additionally or alternatively, in some embodiments, at 212, process 200 can associate received speech input with a user that provided the speech input such that, in a situation in which a different user is speaking a keyword indicated at 208 and/or 210, the mechanisms described herein would recognize that such a user is different from the user that provided the speech input, and not cause, or inhibit from causing, any operations associated with the keywords from being executed. For example, after associating the received speech input with the user that provided the speech input, the mechanisms described herein can utilize a voice recognition, speaker identification, or speaker verification technique as described above in connection with 106 of FIG. 1 to determine that the user is different from the user that provided the speech input.

If at 206, process 200 determines not to configure multiple voice operations for the end-point device, then at 214, process 200 can receive user input indicating an operation for a voice command.

In some embodiments, at 214, process 200 can receive user input using any suitable technique or combination of techniques. For example, process 200 can receive user input using a technique as described above in connection with 210.

At 216, process 200 can receive speech input and associate the speech input with an indicated operation.

In some embodiments, at 216, process 200 can receive speech input using any suitable technique or combination of techniques. For example, process 200 can receive speech input using a technique as described above in connection with 212.

In some embodiments, at 216, process 200 can create any suitable association between received speech input and an indicated operation. For example, process 200 can create an association as described above in connection with 212.

In some embodiments, at 216, process 200 can receive speech input subsequent to prompting a user to enter speech input. For example, process 200 can cause a message to be presented on a user interface that prompts a user to provide speech input. As another example, process 200 can cause an audio message to be presented that prompts a user to provide speech input.

In some embodiments, at 216, process 200 can prompt a user to enter speech input that corresponds to a predetermined keyword, keywords, and/or key phrase (e.g., as described above in connection with FIG. 1). For example, in a situation in which an operation being configured is a call transfer operation (e.g., as described above in connection with FIG. 1), process 200 can prompt a user to provide speech input corresponding to the phrase "I'll take the call on another device," or any other suitable key phrase.

At 218, process 200 can identify at least one keyword or key phrase from speech input.

In some embodiments, at 218, process 200 can identify at least one keyword or key phrase using any suitable technique or combination of techniques. For example, process 200 can use any suitable speech recognition technique (e.g., a speech recognition technique as described above in connection with FIG. 1).

At 220, process 200 can store command information based on user inputs received at 208, 210, 212, 214, 216, and/or 218.

In some embodiments, the command information to be stored can include any suitable information that is based on user inputs. For example, command information can include indications of keywords received at 208, 210, 216, and/or 218. As another example, command information can include audio data and/or any other suitable data corresponding to and/or based on speech inputs received 208, 210, 212, 214, 216, and/or 218. As yet another example, the command information can include information identifying an operation indicated at 210 and/or 214.

In some embodiments, at 220, process 200 can store command information at any suitable location. For example, process 200 can store command information at a server device (e.g., a server device of a calling service, as described below in connection with FIG. 4). As another example, process 200 can store command information at an end-point device. As a more particular example, in a situation where process 200 is configuring a call transfer voice command, process 200 can store command information at a primary end-point device (e.g., an end-point device that would receive an invitation to join a call that would be transferred using the voice command being configured).

In some embodiments, command information to be stored can include any suitable information. For example, the command information can include command information as described above in connection with FIG. 1.

Figure 3:
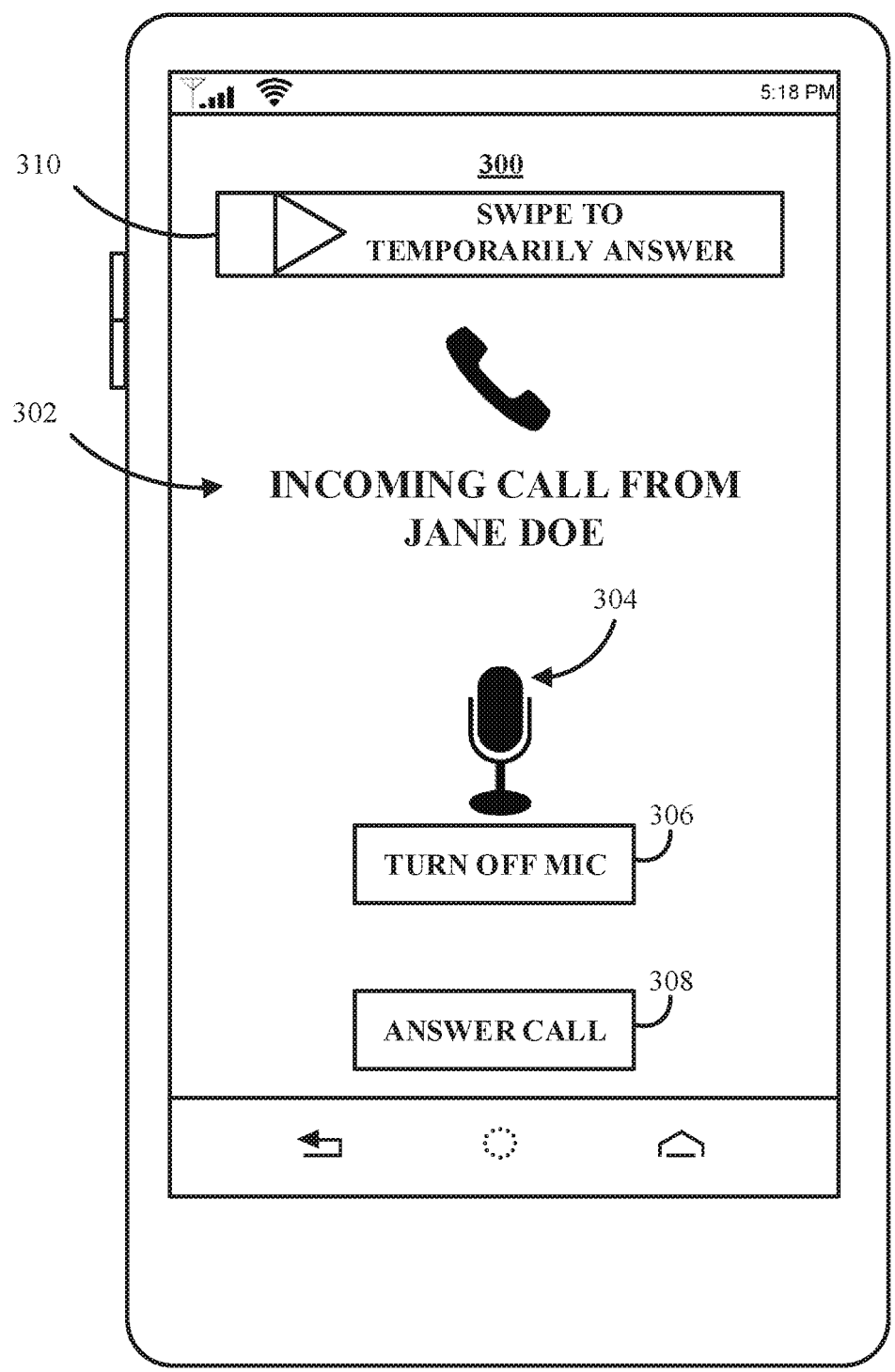
FIG. 3 shows an example of a user interface for implementing voice-based call operations in accordance with some embodiments of the disclosed subject matter.

FIG. 3 shows an example 300 of a user interface for implementing voice-based call operations in accordance with some embodiments of the disclosed subject matter.

In some embodiments, user interface 300 can include a call notification element 302, a microphone status element 304, a microphone input element 306, a call answer input element 308, and a temporarily answer input element 310.

In some embodiments, call notification element 302 can be any element suitable for presenting a notification of a call. For example, call notification element 302 can be a message, an icon, an image, a video, an e-mail, a text message, a pop-up message, or any other element suitable for presenting a notification of a call. Additionally or alternatively, in some embodiments, call notification element 302 can be a tactile or audio notification element.

In some embodiments, microphone status element 304 can be any element suitable for presenting a status of a microphone. For example, microphone status element 304 can be a message, an icon, an image, a video, a pop-up message, or any other user interface element suitable for presenting the status of a microphone.

In some embodiments, microphone status element 304 can present any suitable microphone status, such as an on status, an off status, a volume status, any other suitable status, or any suitable combination thereof.

In some embodiments, microphone input element 306 can be any input element suitable for receiving a user input for controlling a microphone. For example, microphone input element 306 can be a selectable icon, a button, a switch, a scale, a slider, any other suitable input element, or any suitable combination thereof.

In some embodiments, in response to being selected, microphone input element 306 can cause process 100 as described above in connection with FIG. 1, and/or cause process 200 as described as described above in connection with FIG. 2, to receive audio data and/or speech input via a microphone connected to a device that is presenting user interface 300.

In some embodiments, call answer input element 308 can be any input element suitable for answering a call. For example, call answer input element 308 can be a selectable icon, a button, a switch, a scale, a slider, any other suitable input element, or any suitable combination thereof.

In some embodiments, temporarily answer input element 310 can be any input element suitable for causing a call to be temporarily answered. For example, temporarily answer input element 310 can be a selectable icon, a button, a switch, a scale, a slider, any other suitable input element, or any suitable combination thereof.

In some embodiments, in response to being selected, temporarily answer input element 310 can cause a call to be temporarily answered using any suitable technique or combination of techniques. For example, temporarily answer input element 310 can cause a call to be temporarily answered by accepting the call, allowing a user of user interface 300 to speak on the call, and causing the call to be terminated after a predetermined time. In such an example, the call can be any suitable type of call. As another example, temporarily answer input element 310 can cause a user's voice command to be recorded, then cause the call to be answered, and cause the recording of the user's voice command to be presented in the call. As a more particular example, a user can receive a phone call on a mobile phone, and while the mobile phone is ringing, select temporarily answer input element 310, and say the phrase "I'm driving right now, call you back." In response, temporarily answer input element 310 can cause the user's voice saying the phrase to be recorded, cause the mobile phone to accept the call, and cause the mobile phone to transmit the recorded phrase via the connected call.

In some embodiments, in response to being selected, temporarily answer input element 310 can further cause any suitable settings to be engaged in connection with a temporary answer of a call. For example, temporarily answer input element 310 can cause a speakerphone setting to be engaged, cause a volume setting to be engaged, cause a video camera of the device presenting user interface 300 to be engaged, cause any other suitable setting to be engaged, or any suitable combination thereof.

In some embodiments, in addition to or in lieu of temporarily input element 310, the mechanisms described herein can cause a call to be temporarily answered, as described above, utilizing process 100 as described above in connection with FIG. 1 and/or process 200 as described above in connection with FIG. 2. For example, a voice command for a temporarily answer operation can be configured using process 200, and the voice command can be detected and the temporarily answer operation executed using process 100.

Figure 4:
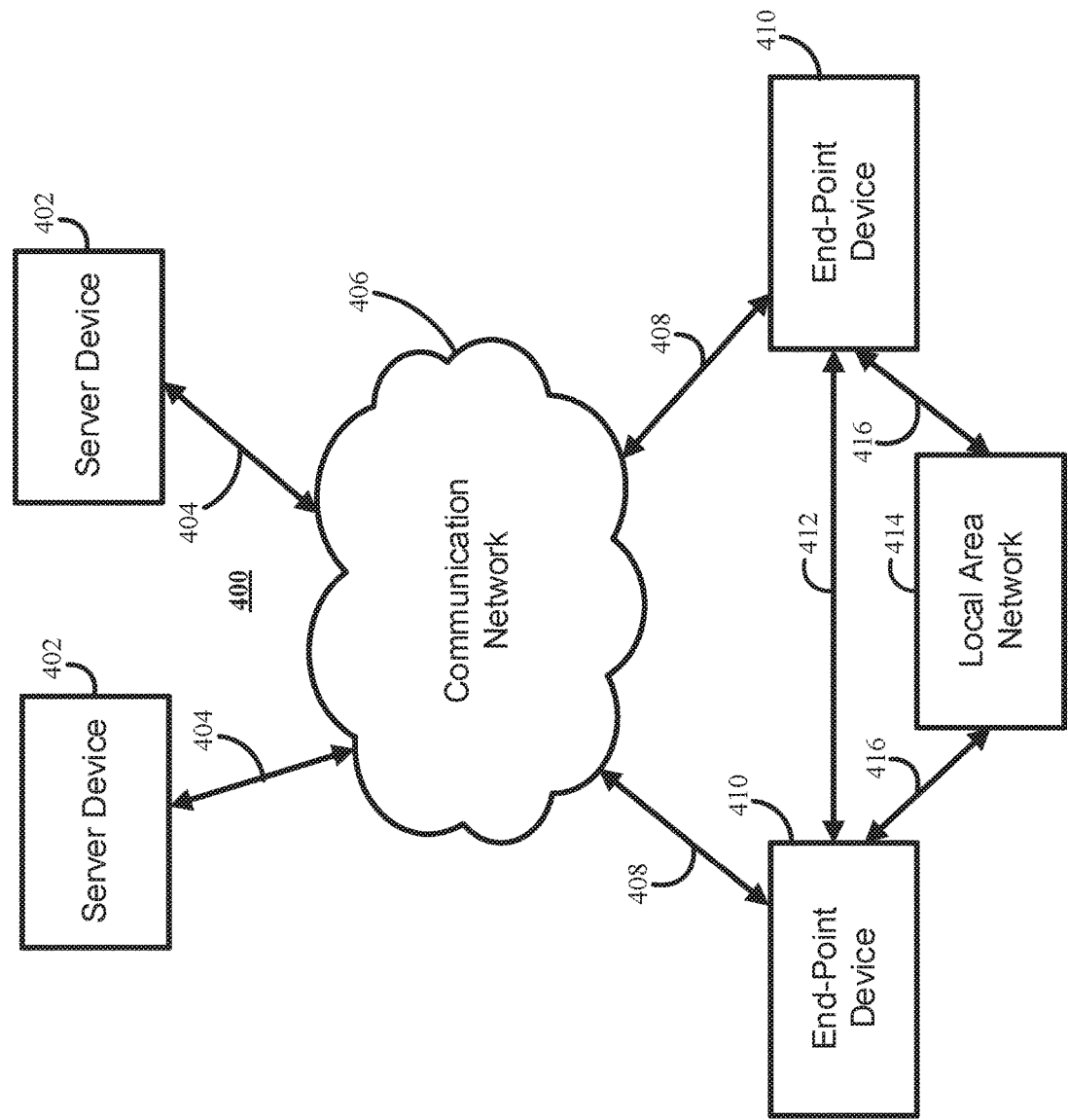
FIG. 4 shows a schematic diagram of an example of a system suitable for implementation of the mechanisms described herein for voice-based call operations in accordance with some embodiments of the disclosed subject matter.

FIG. 4 shows a schematic diagram of an example 400 of a system suitable for implementation of the mechanisms described herein for voice-based call operations in accordance with some embodiments of the disclosed subject matter. As illustrated, system 400 can include two server devices 402, a communication network 406, two end-point devices 410, and a local area network 414.

In some embodiments, server devices 402 can be any server devices suitable for implementing some or all of the mechanisms described herein for voice-based call operations. For example, each server device 402 can be a server device that executes one or more portions of process 100 as described above in connection with FIG. 1 and/or one or more portions of process 200 as described above in connection with FIG. 2. In some embodiments, one or more server devices 402 can connect with one or more end-point devices 410 via communication network 406 for a call (e.g., a video call, a VoIP call, and/or any other suitable call), and/or to transmit invitations to join a call (e.g., invitations to join a call as described above in connection with 102 of FIG. 1). In some embodiments, one or more of server devices 402 can be associated with a calling service (e.g., a video calling service or a VoIP calling service). Additionally or alternatively, in some embodiments, one or more of server devices 402 can store user account information associated with a calling service. In some embodiments, one or more server devices 402 can store any suitable command information.

Communication network 406 can be any suitable combination of one or more wired and/or wireless networks in some embodiments. For example, communication network 406 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network.

End-point devices 410 can be connected by one or more communications links 408 to communication network 406 which can be linked via one or more communications links 404 to server devices 402. Communications links 404 and/or 408 can be any communications links suitable for communicating data among end-point devices 410 and server devices 402, such as network links, dial-up links, wireless links, hard-wired links, any other suitable communications links, or any suitable combination of such links.

Local area network 414 can be any suitable local area network in some embodiments. For example, local area network 414 can be a Wi-Fi network, an Ethernet network, a home area network, an intranet network, or any other suitable local area network.

End-point devices 410 can include any one or more user devices suitable for receiving and/or connecting to phone calls, video calls, VoIP calls, any other suitable calls, or any suitable combination thereof. Additionally, end-point devices 410 can include any one or more user devices suitable for presenting user interfaces, receiving user inputs and/or speech inputs as described above in connection with FIG. 1, FIG. 2, and FIG. 3, and/or any other suitable functions. For example, in some embodiments, end-point devices 410 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, end-point devices 410 can be implemented as a non-mobile device such as a desktop computer, a set-top box, a television, a streaming media player, a game console, and/or any other suitable non-mobile device.

In some embodiments, end-point devices 410 can be connected via communications link 412, and/or via communications link 416 and local area network 414. Communications links 412 and 416 can be any suitable communications links, such as a wired communications links (e.g., via Ethernet, Universal Serial Bus, or any other suitable wired communications link), near-field communications links, BLUETOOTH communications links, Wi-Fi communications links, or any other suitable communications links.

Although two server devices 402 are shown in FIG. 4 to avoid over-complicating the figure, the mechanisms described herein for voice-based call operations can be performed using any suitable number of server devices in some embodiments. For example, in some embodiments, the mechanisms can be performed by a single server device 402 or multiple server devices 402.

Although two end-point devices 410 are shown in FIG. 4 to avoid over-complicating the figure, any suitable number of end-point devices, and/or any suitable types of end-point devices, can be used in some embodiments.

Server devices 402 and end-point devices 410 can be implemented using any suitable hardware in some embodiments. For example, server devices 402 and end-point devices 410 can be implemented using hardware as described below in connection with FIG. 5. As another example, in some embodiments, devices 402 and 410 can be implemented using any suitable general purpose computer or special purpose computer. Any such general purpose computer or special purpose computer can include any suitable hardware.

Figure 5:
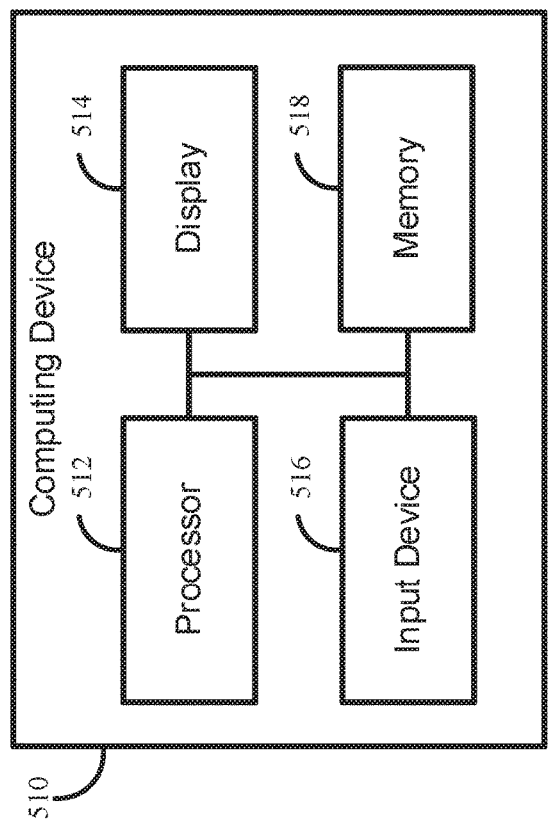
FIG. 5 shows an example of hardware that can be used in accordance with some embodiments of the disclosed subject matter.

FIG. 5 shows an example 500 of hardware that can be used in accordance with some embodiments of the disclosed subject matter.

Hardware processor 512 can execute the processes described herein for configuring voice-based call operations (e.g., as described above in connection with FIG. 2), detecting and executing voice-based call operations (e.g., as described above in connection with FIG. 1), and/or to perform any other suitable functions in accordance with the mechanisms described herein for voice-based call operations (e.g., as described above in connection with FIG. 1, FIG. 2, FIG. 3, and/or FIG. 4). In some embodiments, hardware processor 512 can send and receive data through communications links 404, 408, 412, 416, or any other communication links using, for example, a transmitter, a receiver, a transmitter/receiver, a transceiver, or any other suitable communication device. In some embodiments, memory and/or storage 518 can include a storage device for storing data received through communications link 404, 408, 412, 416, or any other communication links. The storage device can further include a program for controlling hardware processor 512. In some embodiments, memory and/or storage 518 can store command information (e.g., as described above in connection with 108 of FIG. 1 and 220 of FIG. 2). Display 514 can include a touchscreen, a flat panel display, a cathode ray tube display, a projector, a speaker or speakers, and/or any other suitable display and/or presentation devices. Input device 516 can be a computer keyboard, a computer mouse, a touchpad, a voice recognition circuit, a touchscreen, a microphone, and/or any other suitable input device. In some embodiments, user device 512 can be implemented using any of the above-described hardware for user device 510.

Any other suitable components can be included in hardware 500 in accordance with some embodiments.

In some embodiments, at least some of the above described blocks of the processes of FIG. 1 and FIG. 2 can be executed or performed in any order or sequence not limited to the order and sequence shown in and described in connection with the figures. Also, some of the above blocks of FIG. 1 and FIG. 2 can be executed or performed substantially simultaneously where appropriate or in parallel to reduce latency and processing times. Additionally or alternatively, in some embodiments, some of the above described blocks of the processes and/or components of FIG. 1, FIG. 2, FIG. 3, FIG. 4, and/or FIG. 5 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media. Accordingly, methods, systems, and media for voice-based call operations are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method comprising:
causing, at a first user device, an invitation to join a communication of a communication type in a telecommunication channel to be presented, wherein the invitation is configured for a particular communication application installed on the first user device and wherein the invitation includes an option to temporarily join the communication by accepting the communication of the communication type in the telecommunication channel, activating an audio input device of the first user device, allowing a user of the first user device to speak, and causing the communication of the communication type to be terminated after a predetermined time;
in response to presenting the invitation and in response to determining that the option to temporarily join the communication has been selected, causing the communication to be temporarily joined, activating an audio input device of the first user device that captures audio data, and capturing the audio data of the user of the first device via the audio input device;
determining whether the audio data contains a voice command from a recognized voice based on stored voice information, wherein the voice command is determined to include a first keyword that corresponds to a communication transfer operation for transferring the communication of the communication type to another user device and a second keyword that corresponds to the another user device;
identifying a second user device as the another user device from a plurality of candidate user devices that are connected on a same communication network; and
in response to determining that the audio data contains the voice command from the recognized voice based on the stored voice information and that the voice command includes the first keyword and the second keyword and in response to identifying the second user device, causing the communication of the communication type to be transferred to the second user device that is associated with the second keyword.

2. The method of claim 1, wherein the telecommunication channel is a telephone channel.

3. The method of claim 1, wherein the telecommunication channel is an Internet videotelephony channel.

4. The method of claim 1, further comprising:
in response to receiving the invitation to join the telecommunication channel, presenting a notification of the invitation during a period of time, wherein the period of time is terminated upon acceptance of the invitation, and wherein the voice command is detected during the period of time.

5. The method of claim 1, further comprising causing the second user device to join the telecommunication channel.

6. The method of claim 1, wherein the communication is an SMS message or an MMS message.

7. The method of claim 1, further comprising:
receiving an indication of the second keyword; and
determining that the second keyword is to be associated with the second user device.

8. A system comprising:
a hardware processor that is configured to:
cause, at a first user device, an invitation to join a communication of a communication type in a telecommunication channel to be presented, wherein the invitation is configured for a particular communication application installed on the first user device and wherein the invitation includes an option to temporarily join the communication by accepting the communication of the communication type in the telecommunication channel, activating an audio input device of the first user device, allowing a user of the first user device to speak, and causing the communication of the communication type to be terminated after a predetermined time;
in response to presenting the invitation and in response to determining that the option to temporarily join the communication has been selected, cause the communication to be temporarily joined, activate an audio input device of the first user device that captures audio data, and capture the audio data of the user of the first device via the audio input device;
determine whether the audio data contains a voice command from a recognized voice based on stored voice information, wherein the voice command is determined to include a first keyword that corresponds to a communication transfer operation for transferring the communication of the communication type to another user device and a second keyword that corresponds to the another user device;
identify a second user device as the another user device from a plurality of candidate user devices that are connected on a same communication network; and
in response to determining that the audio data contains the voice command from the recognized voice based on the stored voice information and that the voice command includes the first keyword and the second keyword and in response to identifying the second user device, causing the communication of the communication type to be transferred to the second user device that is associated with the second keyword.

9. The system of claim 8, wherein the telecommunication channel is a telephone channel.

10. The system of claim 8, wherein the telecommunication channel is an Internet videotelephony channel.

11. The system of claim 8, wherein the hardware processor is further configured to:
in response to receiving the invitation to join the telecommunication channel, present a notification of the invitation during a period of time, wherein the period of time is terminated upon acceptance of the invitation, and wherein the voice command is detected during the period of time.

12. The system of claim 8, further comprising causing the second user device to join the telecommunication channel.

13. The system of claim 8, wherein the communication is an SMS message or an MMS message.

14. The system of claim 8, wherein the hardware processor is further configured to:
receive an indication of the second keyword; and determine that the second keyword is to be associated with the second user device.

15. A non-transitory computer-readable medium containing computer-executable instructions that, when executed by a processor, cause the processor to perform a method comprising:

causing, at a first user device, an invitation to join a communication of a communication type in a telecommunication channel to be presented, wherein the invitation is configured for a particular communication application installed on the first user device and wherein the invitation includes an option to temporarily join the communication by accepting the communication of the communication type in the telecommunication channel, activating an audio input device of the first user device, allowing a user of the first user device to speak, and causing the communication of the communication type to be terminated after a predetermined time;

in response to presenting the invitation and in response to determining that the option to temporarily join the communication has been selected, causing the communication to be temporarily joined, activating an audio input device of the first user device that captures audio data, and capturing the audio data of the user of the first device via the audio input device;

determining whether the audio data contains a voice command from a recognized voice based on stored voice information, wherein the voice command is determined to include a first keyword that corresponds to a communication transfer operation for transferring the communication of the communication type to another user device and a second keyword that corresponds to the another user device;

identifying a second user device as the another user device from a plurality of candidate user devices that are connected on a same communication network; and in response to determining that the audio data contains the voice command from the recognized voice based on the stored voice information and that the voice command includes the first keyword and the second keyword and in response to identifying the second user device, causing the communication of the communication type to be transferred to the second user device that is associated with the second keyword.

16. The non-transitory computer-readable medium of claim 15, wherein the telecommunication channel is a telephone channel.

17. The non-transitory computer-readable medium of claim 15, wherein the telecommunication channel is an Internet videotelephony channel.

18. The non-transitory computer-readable medium of claim 15, the method further comprising:

in response to receiving the invitation to join the telecommunication channel, presenting a notification of the invitation during a period of time, wherein the period of time is terminated upon acceptance of the invitation, and wherein the voice command is detected during the period of time.

19. The non-transitory computer-readable medium of claim 15, further comprising causing the second user device to join the telecommunication channel.

20. The non-transitory computer-readable medium of claim 15, wherein the communication is an SMS message or an MMS message.

21. The non-transitory computer-readable medium of claim 15, the method further comprising:

receiving an indication of the second keyword;

determining that the second keyword is to be associated with the second user device.

\* \* \* \* \*